Nov. 7, 1933.　　　N. A. MEARS ET AL　　　1,933,921
HOOD LATCH
Filed March 29, 1932　　　4 Sheets-Sheet 3
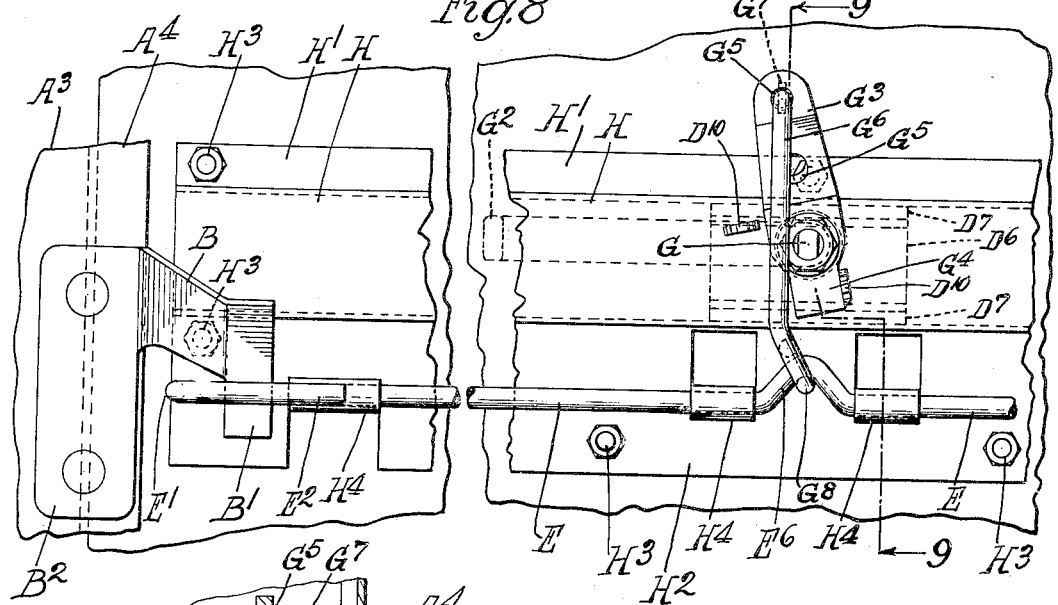
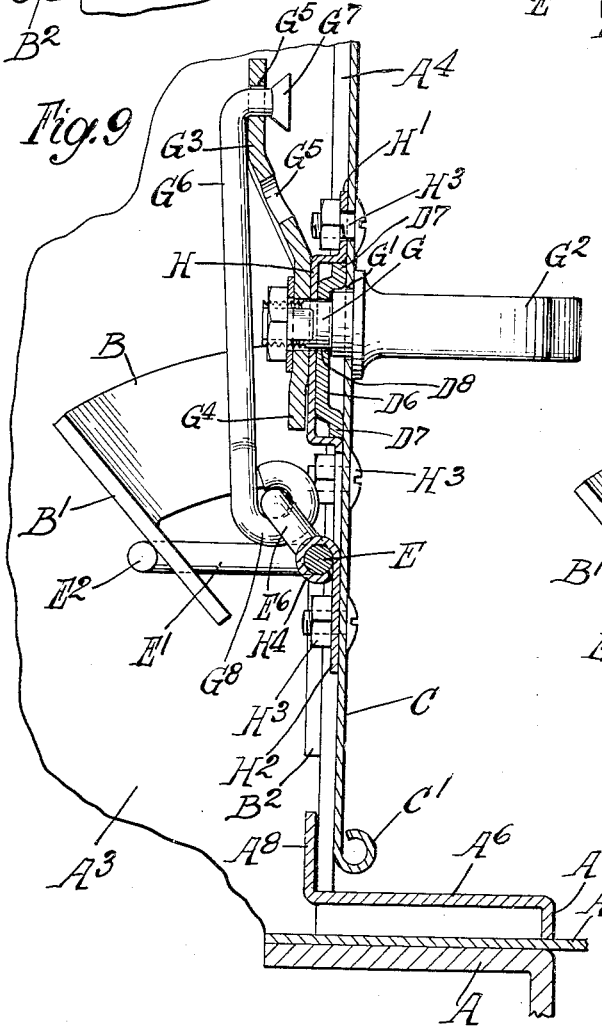
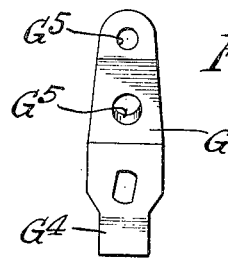
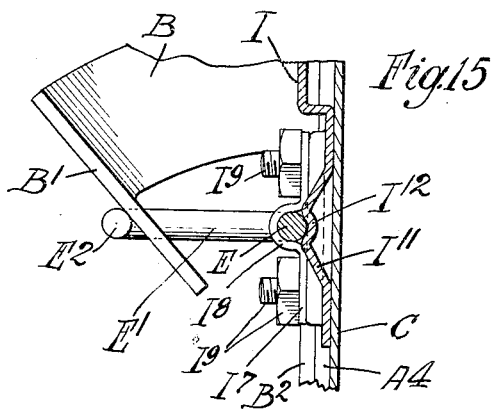
Inventors
Norton A. Mears
Charles A. Perrnon
by Parker & Carter
Attorneys

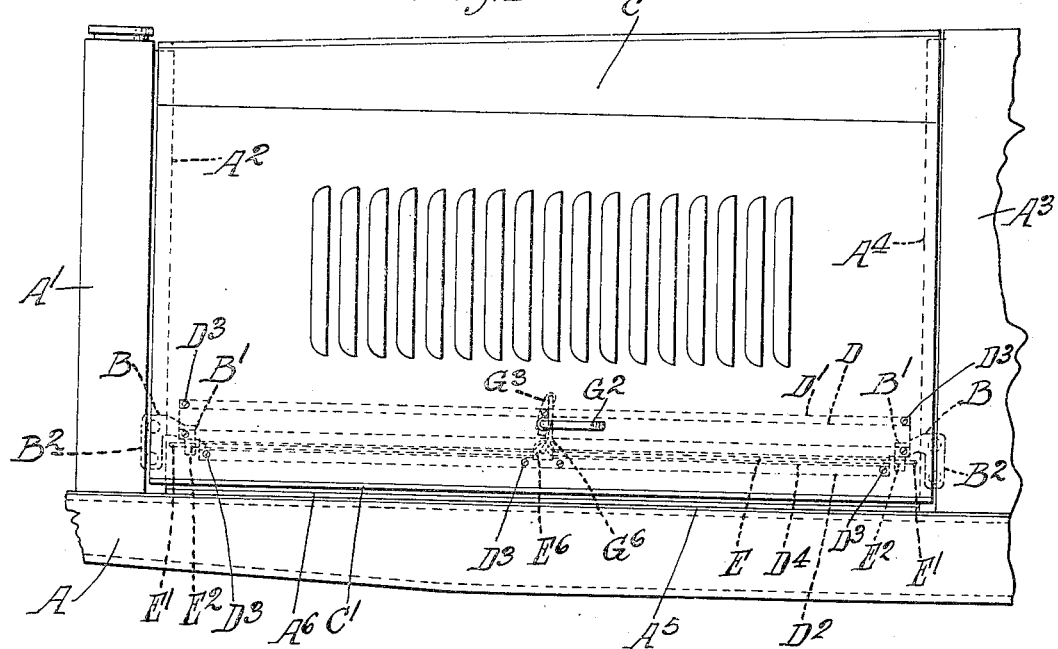
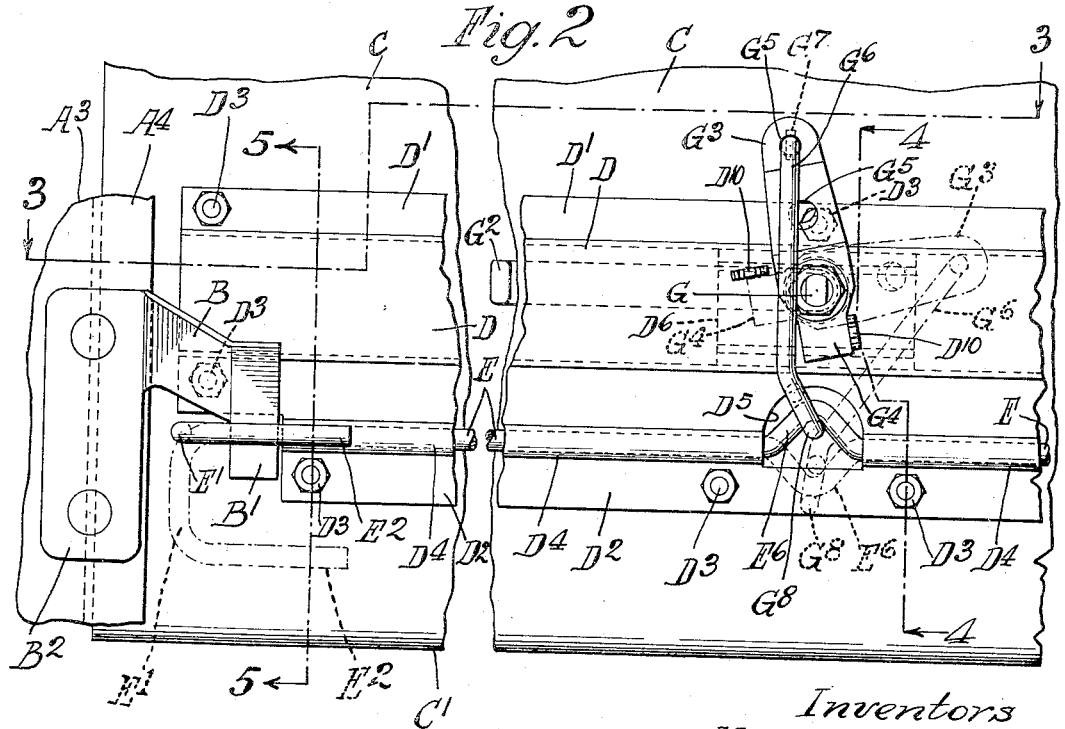

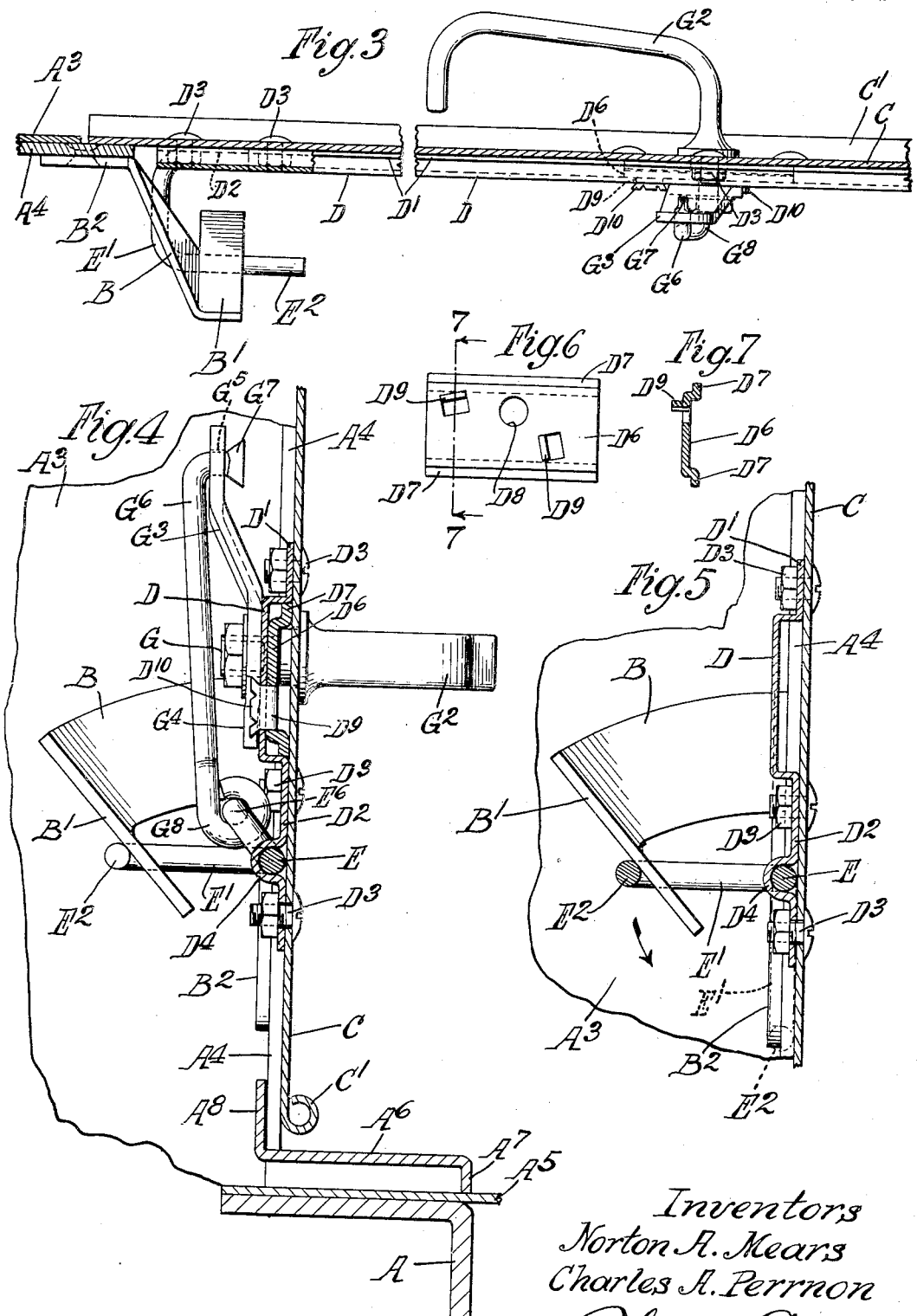

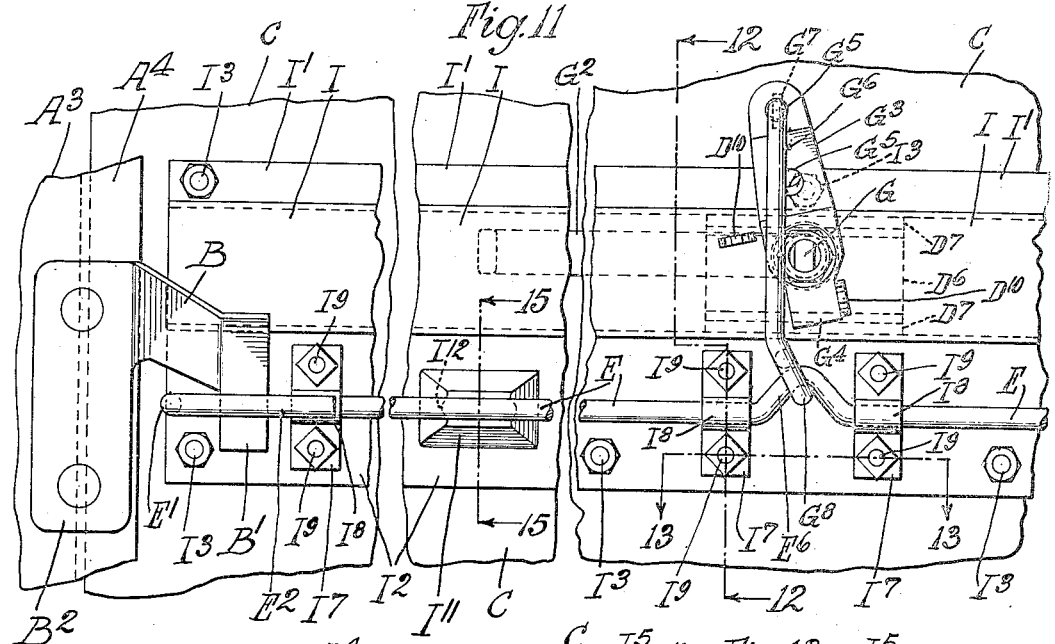
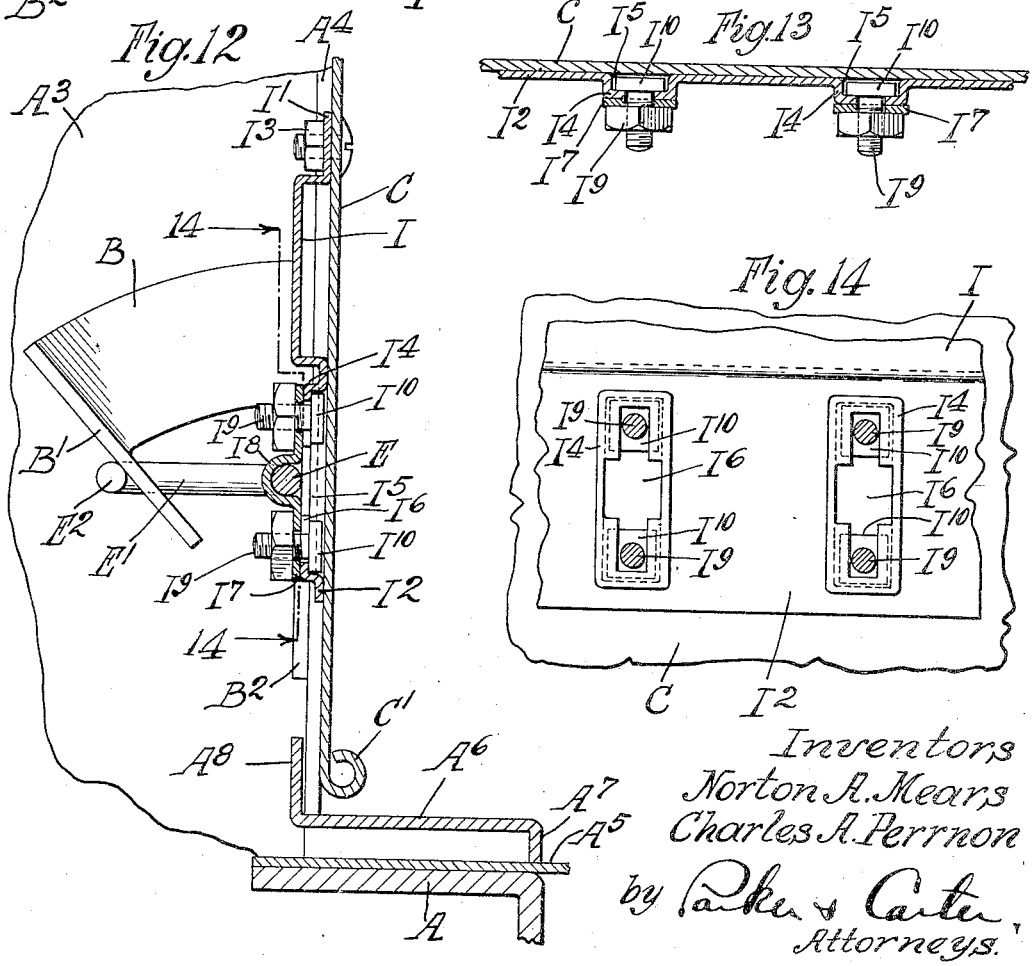

Patented Nov. 7, 1933

1,933,921

UNITED STATES PATENT OFFICE 1,933,921

HOOD LATCH

Norton A. Mears and Charles A. Perrnon, Chicago, Ill., assignors to Chicago Forging & Manufacturing Co., Chicago, Ill., a corporation of Illinois Application March 29, 1932. Serial No. 601,823

4 Claims. (Cl. 292—214)

This invention relates to a latching means for latching the closure of an automobile hood and while it may be used for other purposes, it is primarily concerned with the latching and holding in position of automobile hoods.

One object is to provide a latch of a type particularly adapted for use with relatively long and light hoods and the provision of means for preventing the bending and distortion of the hood.

Another object is to provide means in connection with a hood latching mechanism for stiffening the hood as a whole, irrespective of its length. Another object is to provide means in connection with a hood and hood latch to prevent or dampen vibration of the parts.

Other objects will appear from time to time in the specification and claims.

The invention is illustrated more or less diagrammatically in the accompanying drawings, wherein:—

Figure 1 is a fragmentary side elevation of an automobile showing a closed hood with the hood latching mechanism indicated in dotted lines;

Figure 2 is an inside fragmentary elevation on an enlarged scale with parts omitted and parts broken away, showing the latch in locking position and showing the latch operating mechanism;

Figure 3 is a generally horizontal longitudinal cross section taken at line 3—3 of Figure 2;

Figure 4 is a generally vertical transverse cross section taken at line 4—4 of Figure 2;

Figure 5 is a vertical transverse cross sectional detail taken at line 5—5 of Figure 2;

Figure 6 is a plan view of a stiffening plate which is embodied in the latch operating mechanism;

Figure 7 is a transverse cross section taken at line 7—7 of Figure 6;

Figure 8 is a view generally similar to Figure 2, showing a modified form;

Figure 9 is a transverse vertical cross section taken at line 9—9 of Figure 8;

Figure 10 is a plan view of the lock operating crank or lever arm;

Figure 11 is a view generally similar to Figures 2 and 8, showing a further modification;

Figure 12 is a transverse vertical cross section taken at line 12—12 of Figure 11;

Figure 13 is a longitudinal generally horizontal sectional detail, taken at line 13—13 of Figure 11;

Figure 14 is a generally longitudinal and vertical cross sectional detail taken at line 14—14 of Figure 12; and Figure 15 is a transverse vertical cross section taken at line 15—15 of Figure 11.

Like parts are designated by like characters throughout the specification and drawings.

A indicates a portion of an automobile frame. $A^1$ is a radiator housing or shell which may have attached to it an inwardly bent or spaced flange or projecting member $A^2$. $A^3$ is a cowl having adjacent it or attached to it an inwardly bent flange or member $A^4$. $A^5$ is a portion of a fender which may or may not be present. $A^6$ is a strip which normally forms no part of the hood and is not contacted by the hood. It is usually present to prevent water blowing under the hood. It may have a downwardly bent flange $A^7$ along its outer edge and an upwardly bent flange $A^8$ along its inner edge. It does not ordinarily serve as an abutment for the hood.

Each of the members $A^2$ and $A^4$ carries a hook B having a downwardly facing arm as shown, and a further downward extension $B^1$ which may be at an angle to the arm B. The arm B is fastened to a flattened portion $B^2$ which may be welded, riveted or otherwise fastened to one of the members $A^2$ or $A^4$.

C is a hood or cover portion which may be of any suitable design and may be made of any desirable number of pieces. It may have along its lower edge a curved portion $C^1$ and may be hinged or fastened at its upper edge in any suitable fashion.

Along the hood member C, preferably adjacent its lower edge, is a stiffening and latch carrying member D. It may be generally channel shaped as shown and is provided with a flange $D^1$ and with a larger flange $D^2$. The flanges $D^1$ and $D^2$ are fastened to the hood C by bolts $D^3$ or by welding or riveting or by any other suitable means and the flange $D^2$ has formed in it a curved groove or depression $D^4$ to receive the latch bar, as will be described below. The depression or groove $D^4$ may be cut away as at $D^5$ to provide an opening through which the latch bar may be operated. The channel portion of the stiffener D normally encloses a strengthening and bearing supporting member $D^6$ which may be generally channel shaped and provided with downwardly faced and laterally extending flange portions $D^7$, a perforation $D^8$ for the shaft of the latch operating mechanism and it may have one or more riveting lugs $D^9$ punched out from its face to penetrate through the mating openings in the member D. These may be upset and laterally or otherwise enlarged as at $D^{10}$ to retain them in the member D and in that position as shown for example in Figure 2, they serve also as limiting stops for the operating mechanism of the latch.

Extending generally along the stiffening member D is a latch bar E, curved at its ends as at $E^1$ $E^1$ and provided with inwardly bent portions $E^2$ $E^2$ which may be generally parallel with the main body of the bar, as indicated particularly in Figure 3. Intermediate its ends the latch bar E is bent as at $E^6$ where it is engaged by the latch operating mechanism, the portion $E^6$ serving as a crank section by means of which the latch bar may be rotated. At some point intermediate the ends of the latch bar and for convenience preferably at its center, is located the rotating or operating mechanism.

G is a shaft extending through a port $G^1$ in the hood member C and also through the perforation in the plate $D^6$ and at its outer end there is fixed to the shaft a handle $G^2$ by means of which it may be rotated. The handle also serves as a means for raising the hood and lowering it when it is unlocked. Removably fastened to the inner end of the shaft G is a crank arm $G^3$ which at one end carries a short and preferably inwardly bent portion $G^4$. This portion contacts the stops $D^{10}$, particularly as indicated in Figure 2, to limit movement of the shaft handle and associated parts. The portion of the crank arm opposite the stop portion $G^4$ extends radially from the shaft and is provided with one or more perforations $G^5$. In one of these there is fastened a part $G^6$ which, at its upper end, may be provided with an enlargement $G^7$ and at its lower end may be rounded or looped as at $G^8$ to engage the bent portion $E^6$ of the latch rod E. Thus when the handle $G^2$ is moved, the shaft to which it is attached is rotated. The crank arm $G^3$ is rotated and the latch rod is rotated so as to be moved into and out of locking or engaging position with the hooks B, $B^1$.

In the modified form shown in Figures 8 and 9, a stiffener of somewhat different construction from that shown in the earlier figures is used. It is similar to that shown, however, in that the stiffener carries the entire latch and latch operating mechanism except for the fixed hook members B, which are, of course, mounted on the cowl, the radiator shell, or other parts of the automobile. A stiffening member H is used. It is preferably given a channel shape as indicated and has one relatively narrow flange $H^1$ and a wider flange $H^2$. By means of bolts, screws or other fastening means $H^3$, preferably engaging the flanges, the stiffener H is fastened to the hood C. It might, of course, be welded, soldered or otherwise secured. Throughout its length at suitable points the stiffener H has upturned bearing members $H^4$. They are preferably formed integrally with the stiffener H and in the form shown in Figures 8 and 9 they are punched out of the wider flange H. They might, of course, be formed of any part of the stiffener as a whole and might be made separately and attached to the stiffener. However made, they form bearing, supporting and guide means for the latch bar E, which is the same as that shown in the earlier figures. The latch operating mechanism is the same in this form as that shown in the earlier figures and passes through and is supported in the channel portion of the member H and in the plate $D^6$ as shown and described in connection with the earlier figures.

As shown in Figures 1 to 15, inclusive, a further modification appears. In this modification, the stiffener I is preferably formed generally as a channel member and may have one relatively narrow flange $I^1$ and a wider flange $I^2$. These flanges are fastened to the hood C by rivets or bolts $I^3$, or by welding, soldering or any other suitable means. There are formed preferably in the flange $I^2$ a plurality of upset portions $I^4$ which form corresponding depressions $I^5$. These may be cut away as at $I^6$ as shown particularly in Figure 14. The upset portions $I^4$ serve as supports for bearing members $I^7$ which carry, position and furnish bearings for the latch rod or bar E as illustrated generally in Figure 11 and in greater detail in Figure 12. The bearing members $I^7$ are preferably rounded as at $I^8$ to provide a rounded and suitable bearing surface for the latch bar E. The bearing members $I^7$ and $I^8$ are removably held in position by bolts $I^9$ which preferably have squared heads $I^{10}$ fitting within and corresponding generally in shape to the depression $I^5$ formed by the upsetting of the portion $I^4$. The operating mechanism for moving the latch bar is the same in this form of the invention as shown and discussed in connection with the other forms. Either the channel portion or some other portion of the stiffener I may be provided with a vibration dampening enlargement $I^{11}$ which is provided with sloping faces, as shown, and a generally longitudinal depression $I^{12}$ into which the latch bar may be positioned. By this construction the latch bar is held under tension. The vibration dampening piece may be formed integrally with the stiffener I or may be made separately and added.

It will be realized that whereas we have herewith shown and described a practical operative device, nevertheless many changes might be made in the size, shape, number and disposition of parts without departing from the spirit of our invention and we wish, therefore, that our showing be taken as in a sense diagrammatic.

In particular, where we have shown the latch operating mechanism built into the channel portion of the stiffener and the latch bar built into one of the flanges, we might reverse this, building the bar into the channel portion and the latch operating mechanism into the flanges or for some purposes both parts might be built either into the flange or into the channel, or one might be built into one flange and the other built into another flange. While throughout the specification we have spoken of channel portions and while the stiffener is shown as having a channel portion, it might, of course, be given a rounded section instead of a channel section and it might be given any form which would stiffen it and it might even take the form of a mere plate where such a plate can be made heavy enough for stiffness. For some purposes the groove $D^4$ in the form shown in Figure 2, might be formed at the edge of the flange $D^2$, which could then probably be made narrower, so that there would be little or none of the flange extending beyond the edge of the groove.

The use and operation of our invention are as follows:

With the parts assembled generally as shown, and as illustrated generally in Figure 1, with the handle $G^2$ in a generally horizontal position, the hood is latched. This position is shown in greater detail in Figures 2 and 4. It will be noticed that with the parts in this position, the bent portions $E^2$ of the latch bar E are raised and engage the hook portions $B^1$. As shown particularly in Figure 4 these portions are outwardly and downwardly inclined so that as the hooks $E^2$ of the latch bar engage them, they have a camming action to force the hood inwardly and thus to hold it tightly in position.

If now it is desired to unlatch the hood, the handle G² is rotated toward a vertical position. This movement of the handle rotates the shaft G and the crank arm G³, moving it from the generally vertical position shown in full lines in Figure 2 toward a generally horizontal position shown in dotted lines in Figure 2. As the crank arm moves toward the position shown, the link G⁶ is carried from its generally vertical position shown in full lines in Figure 2, toward an inclined position shown in dotted lines in that figure, and as it goes from the first toward the second position, since it engages the portion E⁶ of the latch rod, it rotates the latch rod downwardly toward the dotted line position of Figure 2, and so rotates the hook portions E² of the latch rod away from the position shown for example in full lines in Figure 2 toward the position shown in dotted lines in that figure, and thus moves these portions of the latch rod out of engagement with the hooks B¹ and thus unlatches the hood and frees it for movement.

The latching or closing movement of the mechanism is the reverse of the unlatching described above. When the parts are unlatched the handle G² occupies a generally vertical position, and the hook portions of the latch rod are swung downwardly into the dotted line positions shown in Figure 2. Rotary movement of the handle to swing the crank arm G³ upwardly carries with it the link G⁶ and rotates the latch rod to bring its hook portions E² into engagement with the fixed hooks B¹ and thus to latch the hood in place. The cam faces of the hooks B¹ serve to make a progressively tightening engagement between the latch members E² and the hook members B¹, and they may or may not be used in the second or third form shown.

The use and operation of the other forms is essentially the same as that described above. The latch bar, the fixed hooks and the latch bar operating mechanism will ordinarily be identical and their mode of operation will be identical. Rotation or other movement of the handle causes movement of the latch bar so as to move the engaging portions of the latch bar into and out of engagement with the fixed hooks and this method of operation would be essentially the same if the stiffener and the details of mounting the latch bar and operating mechanism mounted upon it were varied as suggested above.

We claim:

1. In a hood latch construction of the type wherein an elongated latch bolt is mounted upon one face of a hood member by spaced bearing members, a hood stiffener adapted to be interposed between the hood and bolt member to support the bolt upon one face of the hood, said stiffener comprising a substantially rigid channel bar including longitudinally extending side flanges connected by a web portion, the side flanges terminating in oppositely directed offset foot flanges, one of said foot flanges carrying means for supporting a latch bolt longitudinally of the bar, the web portion of the bar being provided with means to receive and support a latch bolt operating shaft transversely of the axis of the bolt supporting means.

2. In a hood latch construction of the type wherein a longitudinal latch bolt is mounted upon one face of a hood member by spaced bearing members, a hood stiffener adapted to be interposed between the hood and bolt member to support the bolt upon one face of the hood, said stiffener comprising a substantially rigid channel bar including longitudinally extending side flanges connected by a web portion, the side flanges terminating in oppositely directed offset foot flanges, one of said foot flanges carrying means for supporting a latch bolt longitudinally of the bar, the web portion of the bar being provided with means to receive and support a latch bolt operating shaft transversely of the axis of the bolt supporting means, said last mentioned means including a stiffening plate housed within the space defined by the side flanges of the bar adjacent to the bolt operating shaft supporting means provided in the web portion of the bar.

3. In a hood latch construction of the type wherein a longitudinal latch bolt is mounted upon one face of a hood member by spaced bearing members, a hood stiffener adapted to be interposed between the hood and bolt member to support the bolt upon one face of the hood, said stiffener comprising a substantially rigid channel bar including longitudinally extending side flanges connected by a web portion, the side flanges terminating in oppositely directed offset foot flanges, one of said foot flanges carrying means for supporting a latch bolt longitudinally of the bar, the web portion of the bar being apertured to receive and support a latch bolt operating shaft transversely of the axis of the bolt supporting means, a stiffener plate housed within the space defined by the side flanges of the bar, said stiffener plate being apertured in alignment with the aperture of the web and cooperating with the web to support a bolt operating shaft.

4. In a hood latch construction of the type wherein the longitudinal latch bolt is mounted upon one face of a hood member by spaced bearing members, a hood stiffener adapted to be interposed between the hood and the bolt member to support the bolt member upon one face of the hood, said stiffener comprising a substantially rigid channel bar including longitudinally extending side flanges connected by a web portion, the side flanges terminating in oppositely directed offset foot flanges, one of said foot flanges carrying lug members struck from said flange at longitudinally spaced points, said lugs being bent to form aligned bolt receiving bearings, the web portion of the bar being provided with means to support a bolt operating shaft transversely of the axis of said aligned bolt bearings, and means to secure the bar to the face of a hood with the web portion of the bar in spaced relation thereto.

NORTON A. MEARS.
CHAS. A. PERRNON.